BROAD-BAND PHASE-SHIFTING CIRCUIT
Filed Aug. 16, 1952
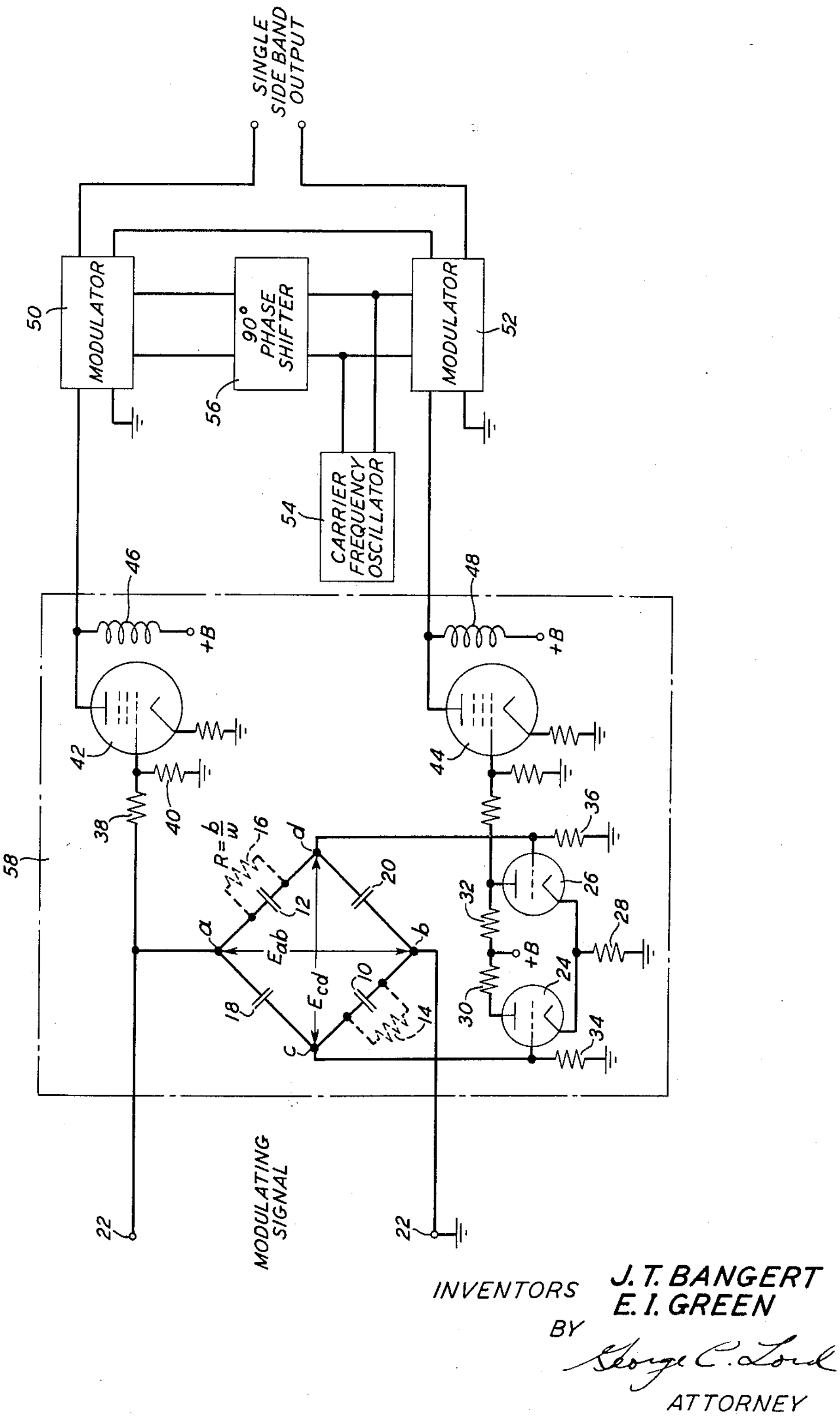
INVENTORS J. T. BANGERT
E. I. GREEN
BY George C. Lord
ATTORNEY United States Patent Office 2,726,368

Patented Dec. 6, 1955

2,726,368

BROAD-BAND PHASE-SHIFTING CIRCUIT

John T. Bangert, Summit, and Estill I. Green, Short Hills, N. J., assignors to Bell Telephone Laboratoreis, Incorporated, a corporation of New York Application August 16, 1952, Serial No. 304,676

10 Claims. (Cl. 332—45)

This invention relates to broad band phase shifting circuits and more particularly to circuits for producing quadrature voltages suitable for use in the phase discrimination method of producing single sideband signals, for example.

It has long been a problem in the construction of electrical circuits to provide a phase shifting circuit capable of producing two broad band signals which are accurately in quadrature over the entire band of signal frequencies. It is relatively easy to provide adequate phase shifting arrangements for use with signals comprising a single frequency or at most a relatively narrow band of frequencies. Such narrow band phase shifting circuits have found many applications in the electrical art but are not suitable for other important applications. In many instances, and particularly in apparatus for producing single sideband signals by phase discrimination, a phase shifting circuit is required to operate upon relatively broad band signals. In a typical circuit of this type, for example, a band width of 10 to 15 kilocycles is common and band widths of the order of 10 megacycles may be encountered. Heretofore input signals having band widths of this order of magnitude have been converted into quadrature components by relatively complicated circuits usually comprising multiple section lattice structures which are both difficult and expensive to construct. Even this type of circuit, however, suffers from a restricted effective band width and severely limits the use of single sideband modulators of the type in which two double sideband signals are produced by identical modulators with the carrier and message signal inputs to one modulator accurately in quadrature with the corresponding inputs to the other.

It is accordingly an object of the invention to produce from broad band input signals two output voltages which are accurately in quadrature over the entire band of frequencies. Further objects of the invention are to produce from such an input signal an output voltage which is in quadrature therewith over the entire band of frequencies and to produce single sideband modulation without the necessity of employing cumbersome and expensive circuit arrangements for the purpose of obtaining the required phase shift.

In accordance with the invention there is provided a circuit which permits the maintenance of a constant phase difference over a broad band of frequencies which may be as great as 10 megacycles in width by utilizing the difference between the loss angle of a special high loss capacitor and that of a conventional low loss capacitor. (The loss angle is the angle whose tangent is equal to the power factor of the capacitor which is the resistive component of the impedance divided by the reactive component.) This circuit is employed as a phase shifter for producing quadrature voltages in which a broad band input signal is applied to a four-arm bridge, a pair of adjacent arms of which include capacitors having a constant power factor and fixed dielectric loss over the frequency band of interest. The remaining arms of the bridge include capacitors having substantially zero loss. The voltages appearing across the two diagonals of the bridge are in quadrature and may be made of constant amplitude. These voltages may then be employed, for example, in single sideband modulation apparatus to produce from a single input voltage including a broad band of frequencies the requisite pair of quadrature signals for the modulation of a pair of carriers which are similarly in quadrature.

The above and other features of the invention will be described in the following specification taken in connection with the drawings, the single figure of which is a schematic circuit diagram partially in block form of a single sideband modulator including the broad band phase shifting circuit of the invention.

In the drawing, the broad band phase shifter is illustrated as forming a part of a single sideband modulator although it is to be understood that this type of phase shifter is also useful in polyphase transmission systems and in the production of wide band circular time bases. Accordingly the phase shifting circuit comprising the elements enclosed by the dashed lines of the drawing will be considered as an entity in the following description and its operation will be illustrated in connection with the over-all modulator circuit of which it forms a part.

The present phase shifting circuit is based upon two effects. The first of these arises from the fact that a typical high quality capacitor has a negligible loss, whereas a capacitor may be designed to have an appreciable loss angle and further by suitable choice of the dielectric employed may be caused to have a loss angle and capacitance which are substantially constant over a wide band of frequencies. The second effect results from the fact that the vector sum of two equal magnitude voltages of different phase is at right angles to the vector difference of the same two voltages regardless of the angle between them. It follows from the above, therefore, that using the voltages across two different capacitors having different loss angles, it is possible to obtain two components, one the sum and the other the difference of these voltages, which are in quadrature. The greater the loss angle the simpler it is to obtain equal magnitudes for the two quadrature voltages, as discussed later. In addition the larger the loss angle the more insensitive the bridge becomes to variations in its component parts. The quadrature relationship is maintained over a band of frequencies restricted only by the width of the band for which a fixed loss angle and capacitance can be obtained for the special capacitor.

The basic requirement for the high loss capacitors employed in the system of the invention is that they shall have a constant power factor and capacitance over the band of frequencies to be employed. In this connection the power factor of a capacitor is defined as the resistance associated with the capacitor divided by its reactance. As is well known the reactance of a capacitor is an inverse function of the frequency of the applied voltage. If therefore the power factor is to be maintained constant with varying frequencies the resistive component must also be caused to vary inversely with frequency. Under these conditions the power factor is a function only of the magnitude of the resistive component and that of the capacitance. Since however the capacitance is a function of the geometry of the particular capacitor and the dielectric material employed, it will be seen that the dielectric constant must be essentially fixed over the frequency range of interest.

Dielectrics filling these requirements include for example Corning Glass No. 790 which has a power factor of .006 which is constant within two percent over the frequency range from 100 cycles to 10 megacycles. The dielectric constant of this material is relatively fixed over this entire frequency range. A capacitor employing this material would have a relatively small loss angle corresponding to approximately four-tenths of a degree. Polyvinalbutyral, on the other hand, has a power factor of .066 corresponding to a loss angle of about four degrees. The dielectric constant changes by about eighteen percent over a frequency range of one megacycle which may limit the use of this dielectric to phase shifters having frequency bands of the order of 10 to 15 kilocycles per second in width. Either of these materials might be used in the special capacitance.

As shown in the drawing one pair of non-adjacent arms of a conventional four arm bridge circuit comprises a pair of high loss dielectric capacitors 10 and 12 which are shown with their dielectric resistances represented by shunting resistors 14 and 16 of resistance $$R=\frac{b}{\omega}$$

where $b$ is a constant and $\omega=2\pi f$. The magnitudes of the capacitances should be related substantially as follows:

$$C_a=C_b\sqrt{\tau 2+1} \quad \tau=bC_b$$

where $C_a$=capacitance of high quality capacitor
$C_b$=capacitance of special capacitor
$\tau$=power factor of special capacitor The remaining arms consist of typical high quality capacitors 18 and 20 having negligible loss over the frequency band of interest. An input signal is applied from terminals 22 across one diagonal $ab$ of the bridge while an output signal is derived from the other diagonal $cd$. The input signal applied across the diagonal $ab$ is then equal essentially to the sum of the voltage drops across one high loss capacitor, for example 10, and one low loss capacitor, for example 18. On the other hand the voltage appearing across the other diagonal $cd$ is equal to the difference between these two quantities. From the principle referred to above it will be understood that the voltage $E_{ab}$ being the sum of two non-coincident equal amplitude voltages must be in quadrature with the voltage $E_{cd}$, which is the difference of these two voltages.

For the purpose of obtaining useful output signals it is desirable to avoid loading the bridge circuit and for this purpose a high impedance load comprising the input impedance of a pair of vacuum tubes is connected between terminals $c$ and $d$ of the bridge. This load may take the form of a conventional differential amplifier comprising a pair of triode type tubes 24 and 26, the cathodes of which are connected together and through a common cathode resistor 28 to ground and the anodes of which are connected through resistors 30 and 32 respectively to a source of positive potential +B. The control grids of the respective tubes are returned through resistors 34 and 36 to ground and are connected respectively to terminals $c$ and $d$ of the bridge circuit. This amplifier offers a high impedance load to the bridge and identical output signals appear across resistors 30 and 32 representing the voltage $E_{cd}$ produced in the bridge circuit. This method of obtaining a difference voltage is only one of many well known methods.

Inasmuch as all of the elements included in the bridge circuit have impedances which vary inversely with frequency the amplitudes, but not the angles, of the voltages produced thereby vary with frequency. Since it is desirable in many applications to provide quadrature voltages of fixed and equal amplitudes additional circuits have been provided. Accordingly the voltage appearing across diagonal $ab$ of the bridge is applied through a voltage divider comprising resistors 38 and 40 to the control grid of a pentode type tube 42 while the voltage appearing across load resistor 32 of amplifier tube 26 and corresponding to the voltage across diagonal $cd$ of the bridge is applied through a similar voltage divider to a second pentode type tube 44. For the purpose of clarity, the details of the screen and suppressor grid circuits of these tubes, which are entirely conventional, have been omitted. The anodes of the tubes are, however, connected to a source of positive potential through impedances 46 and 48 respectively which vary directly with frequency. This characteristic is possessed by inductances and such elements are shown in the drawing. The magnitude of these elements and the operating conditions of tubes 42 and 44 are so chosen as to compensate for amplitude variations resulting from the frequency sensitivity of the bridge circuit. If the input signal is supplied from a constant voltage source, it is unnecessary to provide such loss equalizers. However, the frequency characteristic of the bridge could equally well be compensated by the use of a single loss equalizer connected between the input terminals 22. It is desirable in view of the considerable voltage drop produced by the bridge circuit to so proportion the voltage divider associated with the pentode 42 as to introduce a loss in the input voltage which corresponds to the input voltage to the bridge and accordingly is not otherwise attenuated.

It will be recognized that the circuit thus far described and included within the dashed lines of the drawing provides a convenient and simple means for obtaining from a single broad band input voltage two voltages of equal and constant amplitude which are accurately in quadrature over the frequency band of the input voltage. Such quadrature voltages may, as has been suggested above, be advantageously employed in single sideband modulators of the type in which two double sideband signals of appropriate phase relationships are produced in response to the variations of a single message wave signal and are combined in such a way as to cancel out both the carrier frequency and one or the other of the two sidebands leaving only the other side band for transmission. As shown in the drawing such a modulation system may include a pair of identical modulator circuits 50 and 52 which may be of conventional type and which produce a double sideband output when supplied with an input message signal and a carrier. In the present circuit, the output of a carrier frequency oscillator 54 is applied directly to modulator 52 and through a 90 degree phase shifter 56 to modulator 50. Since the output of oscillator 54 is essentially of a single frequency, phase shifter 56 offers no problem and may be of any conventional form.

A modulating signal is applied to terminals 22 and thence to the broad band phase shifter 58 previously described above. The connections between phase shifter 58 and modulators 50 and 52 are so arranged that the modulating signal applied to modulator 50 is in phase quadrature with the corresponding signal applied to modulator 52. If the outputs of the two modulators each comprising a double sideband signal are combined in a circuit as shown schematically in the drawing both the carrier frequency components and the components comprising one sideband cancel leaving for transmission a single sideband output. It will be understood that the outputs of the two modulators may be subtracted rather than added to obtain the other sideband if desired.

What is claimed is:

1. A phase shifting circuit for producing from a broad band input signal having a band width of the order of megacycles a voltage which is in quadrature therewith over the signal band of frequencies comprising a four-arm bridge circuit, high quality impedance elements having substantially zero loss in each of a pair of opposite arms of said bridge, an impedance element having a fixed capacitance and an internal resistance inversely proportional to frequency over said band in each of the remaining arms of said bridge, means for applying said broad band signal across one diagonal of said bridge and an output circuit connected across each diagonal of said bridge.

2. A phase shifting circuit for producing from broad band input signals having a band width as great as 10 megacycles voltages which are equal and in quadrature over the signal band of frequencies comprising a four-arm bridge circuit, high quality capacitors having substantially zero loss in each of a pair of opposite arms of said bridge, a capacitor having a constant power factor with an internal resistance which is inversely proportional to frequency and a fixed capacitance over said band in each of the remaining arms of said bridge, means for applying said broad band signals across one diagonal of said bridge and an output circuit connected across each diagonal of said bridge, at least one of said output circuits including means for changing the amplitude of the output voltage therein to equalize the voltages in the two output circuits.

3. A phase shifting circuit for producing from broad band input signals having a band width of the order of megacycles quadrature voltages of constant amplitudes over the signal band of frequencies comprising a four-arm bridge circuit, high quality capacitors having substantially zero loss in each of a pair of opposite arms of said bridge, a capacitor having fixed capacitance and an internal resistance inversely proportional to frequency over said band in each of the remaining arms of said bridge, means for applying said broad band signal across one diagonal of said bridge, output circuits connected across each diagonal of said bridge, and an element in each of said output circuits having an impedance which varies directly with frequency.

4. A phase shifting circuit for producing from broad band input signals having a band width as greast as 10 megacycles equal voltages which are in quadrature over the signal band of frequencies comprising a four-arm bridge circuit, high quality capacitors having substantially zero loss in each of a pair of opposite arms of said bridge, a capacitor having a constant power factor with an internal resistance which varies inversely with frequency and a fixed capacitance over said band in each of the remaining arms of said bridge, means for applying said broad band signals across one diagonal of said bridge, output circuits connected across each diagonal of said bridge, an element in each of said output circuits having an impedance which varies directly with frequency and means for equalizing the amplitudes of the voltages in said output circuits.

5. A phase shifting circuit for producing from broad band input signals having a band width of the order of 10 megacycles voltages which are in quadrature over the signal band of frequencies comprising a four-arm bridge circuit, high quality capacitors having substantially zero loss in each of a pair of opposite arms of said bridge, a capacitor having constant power factor with an internal resistance which varies inversely with frequency and fixed capacitance over said band in each of the remaining arms of said bridge, means for applying said broad band signal across one diagonal of said bridge, an output circuit connected across said one diagonal and an output circuit connected across said one diagonal and an output circuit offering a high impedance to applied signals connected across the other diagonal of the bridge and producing an output which varies as the voltage across other said diagonal.

6. A phase shifting circuit for producing from broad band input signals of the order of megacycles in band width voltages which are in quadrature over the signal band of frequencies comprising a four-arm bridge circuit, a pair of opposite arms of which include high quality capacitors having substantially zero loss, a capacitor having a constant power factor with an internal resistance which varies inversely with frequency and fixed capacitance over said band in each of the remaining arms of said bridge, means for applying said broad band signal across one diagonal of said bridge, an output circuit connected across said one diagonal and a second output circuit connected across the other diagonal of the bridge said second output circuit comprising a differential amplifier including a pair of vacuum tubes having at least anode, cathode and control grid elements, separate anode circuits and a common cathode circuit for said tubes, connections between opposite ends of said other diagonal and the respective control grids of said tubes and means for deriving from the anode circuit of one of said tubes a voltage which varies as the voltage across said other diagonal.

7. A phase shifting circuit for producing from broad band input signals as great as 10 megacycles in band width voltages which are in quadrature over the signal band of frequencies comprising a four-arm bridge circuit, high quality capacitors having substantially zero loss in each of a pair of opposite arms of said bridge, a capacitor having a constant power factor with an internal resistance which varies inversely with frequency and fixed capacitance over said band in each of the remaining arms of said bridge, means for applying said broad band signal across one diagonal of said bridge, an output circuit connected across said one diagonal a differential amplifier including a pair of vacuum tubes each having at least anode, cathode and control grid elements, separate anode circuits a common cathode circuit for said tubes, connections between the opposite ends of said other diagonal and the respective control grids of said tubes, and an output circuit connected to one of said anode circuits, each of said output circuits also including an element the impedance of which varies directly with frequency to stabilize the amplitudes of the output voltages.

8. A single sideband modulator for broad band message signals as great as 10 megacycles in band width comprising a pair of identical double sideband modulator circuits, a source of carrier frequency, means for applying said carrier frequency to said modulators in phase quadrature, a phase shifter comprising a four-arm bridge circuit, high quality capacitors having substantially zero loss in a pair of opposite arms of said bridge, a capacitor having a constant power factor with an internal resistance which varies inversely with frequency and fixed capacitance over the band of said input signal in each of the remaining arms of said bridge, means for applying said broad band message signal across one diagonal of said bridge, means for applying the voltage appearing across one diagonal of said bridge to one of said modulators and that appearing across the other diagonal of said bridge to the other of said modulators and means for combining the two double sideband output signals from said modulators to cancel the carrier frequency component and one of the two sidebands.

9. A single sideband modulator for broad band message signals having a band width of the order of megacycles comprising a pair of identical double sideband modulator circuits, a source of carrier frequency, means for applying said carrier frequency to said modulators in phase quadrature, a phase shifter comprising a four-arm bridge circuit, high quality capacitors having negligible loss in each of a pair of opposite arms of said bridge, a capacitor having a constant power factor with an internal resistance inversely proportional to frequency and fixed capacitance over the band of said input signal in each of the remaining arms of said bridge, means for applying said broad band message signal across one diagonal of said bridge, a circuit connecting one of said modulators across one of the diagonals of said bridge, a second circuit for connecting the other modulator across the other diagonal of said bridge each of said circuits including an element having an impedance which varies inversely with frequency and means for combining the outputs of said modulators to afford cancellation of the carrier frequency components and those of one of said sidebands.

10. A single sideband modulator for broad band message signals having a band width of the order of 10 megacycles comprising a pair of identical double sideband modulator circuits, a source of carrier frequency, means for applying said carrier frequency to said modulators in phase quadrature, a phase shifter comprising a four-arm bridge circuit, high quality capacitors having negligible loss in each of a pair of opposite arms of said bridge, a capacitor having a constant power factor with an internal resistance which varies inversely with frequency and fixed capacitance over the band of said input signal in each of the remaining arms of said bridge, means for applying said broad band message signal across one diagonal of said bridge, a circuit applying the voltage appearing across one of the diagonals of said bridge to one of said modulators, a second circuit applying the voltage appearing across the other diagonal of said bridge to the other of said modulators each of said circuits including an element having an impedance which varies inversely with frequency, at least one of said circuits also including a level adjusting device to equalize the amplitudes of the voltages applied to said modulators and means for combining the output signals from said modulators to obtain the difference between them.

References Cited in the file of this patent

UNITED STATES PATENTS

| | | |
|---|---|---|
| 2,424,971 | Davey | Aug. 5, 1947 |
| 2,431,501 | Phillips | Nov. 25, 1947 |

OTHER REFERENCES

"Alternating Current Bridge Methods" by Hague, published by Pitman Publishing Corporation of New York, 1938, pages 510–516, inclusive.